United States Patent
Watanabe

[11] Patent Number: 5,836,567
[45] Date of Patent: Nov. 17, 1998

[54] APPARATUS FOR CONTINUOUS DETECTION OF LOAD IN AN ELECTRIC VALVE ACTUATOR

[75] Inventor: Susumu Watanabe, Hiratsuka, Japan

[73] Assignee: Nippon Gear Co.,Ltd., Japan

[21] Appl. No.: 637,702
[22] PCT Filed: Nov. 19, 1993
[86] PCT No.: PCT/JP93/01704
   § 371 Date: Apr. 30, 1996
   § 102(e) Date: Apr. 30, 1996
[87] PCT Pub. No.: WO95/14186
   PCT Pub. Date: May 26, 1995
[51] Int. Cl.$^6$ ................................. F16K 31/05
[52] U.S. Cl. ..................... 251/129.12; 73/168
[58] Field of Search .......... 251/129.12, 129.03; 73/168; 137/552

Primary Examiner—Marguerite McMahon
Attorney, Agent, or Firm—Graham & James LLP

[57] ABSTRACT

In an electric valve actuator, an apparatus is provided for preventing overload of a motor by continuously detecting the torque of the motor as a prime mover. The apparatus includes a valve stem which is moved up and down by the motor through a reduction transmission mechanism. The reduction mechanism includes a screw feed system such as a worm and a worm wheel. A pressure reception plate is disposed to receive the thrust from this feed system, and a strain gauge is fitted to the pressure reception plate. The torque of the motor can be detected continuously according to the change in resistance of the strain gauge caused by deformation of the pressure reception plate.

7 Claims, 3 Drawing Sheets

APPARATUS FOR CONTINUOUS DETECTION OF LOAD IN AN ELECTRIC VALVE ACTUATOR

TECHNICAL FIELDS

The present invention relates to an apparatus for continuous detection of load in an electric valve actuator which is widely used in a nuclear power plant.

In power or petrochemical plants, a number of valves are used, and generally have electric valve actuators as drive means.

The electric valve actuator has a torque limit switch for detecting torque of more than a fixed value when a valve element bites foreign material to stop a drive source, thereby avoiding damage to the valve.

As torque detecting means in an electric valve actuator, an on/off switch which acts when torque of a motor reaches a predetermined value is generally used.

With respect to part of FIG. 1, a general load detecting apparatus in a conventional electric valve actuator will be described.

In FIG. 1, rotation of a motor 1 is reduced by helical gears 2 and 3, and is transmitted to a worm wheel 7 via a tubular worm 5 which is engaged with a worm shaft 4 integrally connected with the helical gear 3 so that the tubular worm 5 may rotate together with the tubular shaft 4. In a central bore of the worm wheel 7, a tubular stem nut 6 is engaged via a spline so that the nut 6 may rotate together with the worm wheel 7. A valve stem 8 is meshed in an internal thread bore of the stem nut 6. The valve stem 8 is therefore elevated and lowered by rotation of the motor 1.

The tubular worm 5 is meshed with an axial spline 9 in a worm shaft 4. The tubular worm 5 is axially movable on the worm shaft 4, and is rotatable together with the worm shaft 4.

On the front surface of the tubular worm 5, a compression spring 10 in which a plurality of belleville springs are reversely overlapped is directly or indirectly engaged. When the tubular worm 5 moves on the worm shaft 4 forward and backward depending on direction and size of torque of the motor 1, the compression spring 10 is compressed depending on the amount of mounted Torque of the motor 1 can be found by detecting deformation amount by a torque switch 11. Therefore, if the motor 1 turns on and off by the torque switch 11 when it reaches to a predetermined torque, overload can be prevented.

PROBLEMS TO BE SOLVED BY THE INVENTION

However, it is impossible to detect torque of motor continuously by an on/off switch type torque detecting means as above.

In the meantime, in the workplace there is a strong need to confirm stability of the operation at any time without disassembling an electric actuator. To comply with such need, it is necessary to detect torque continuously. Furthermore, to carry out sensitive valve control and to check stability of a torque switch at any time, it is necessary to detect torque continuously.

However, a predetermined tone is normally applied to the compression spring 10, to reduce its size and thus, there is an extreme nonlinear relationship between torque of the motor 1 and movement of the compression spring 10. So, even if means for detecting continuous quantity, such as a potentiometer, is used instead of the torque switch 11, it is impossible to detect torque of a motor continuously.

Instead of the tubular worm 5, the stem nut 6 is axially displaced as screw-feeding type, and by compressing the compression spring based on the movement, torque of motor can be detected. However, it is still impossible to detect torque of a motor continuously.

Patent Laid-Open Pub. No.64-58889 discloses an apparatus for continuously detecting thrust of a valve stem applied by torque of a motor. In this device, a strain gauge is directly attached on the outer circumferential surface of the valve stem, and axial elongation and shrinkage of the valve stem itself opposing torque can be detected. However, the diameter of the valve stem cannot be reduced less than a predetermined length. Accordingly, axial elongation and shrinkage of the valve stem which opposes torque becomes smaller, and the invention as disclosed in Patent Laid-Open Pub. No.64-58889 involves a low detecting rate by a strain gauge, thereby making high sensitive detection impossible. In the invention as disclosed in the publication, the strain gauge axially moves with the valve stem, and leads and connectors are liable to move and loosen.

It is an object of the present invention to provide an apparatus for continuous detection of load in an electric valve actuator in which a strain gauge is mounted to a pressure receiving portion which is much deformed by torque of an operating motor of the electric valve actuator, torque of the motor is continuously detected at high accuracy, thereby watching suitability or unsuitability at any time in operation of the electric valve actuator, the strain gauge being not moved in an axial direction substantially.

DISCLOSURE OF THE INVENTION

To achieve the object, the present invention provides two means as follows:

(1) Based on axial movement of a tubular worm for driving a valve stem, a compression spring is compressed, and torque is detected based on reaction force involved by compression.

(2) Based on axial movement of a stem nut by thrust of a stem nut for driving a valve stem, a compression spring is compressed, and torque is detected based on reaction force involved by compression.

The means in (1) comprises a load continuous detecting apparatus in an electric valve actuator in which a worm shaft which is rotated by a motor is engaged with a tubular worm so that the tubular worm may rotate with and slide axially on the worm shaft a valve element being opened and closed by the tubular worm, characterized in that:

a pressure receiving portion is provided perpendicular to an axis of said tubular worm to receive thrust based on axial movement of said tubular worm, a strain gauge being mounted to the pressure receiving portion torque of said motor being detected by resistance variation of the strain gauge depending on deformation of the pressure receiving portion.

The tubular worm may be engaged with the worm shaft via a spline, thereby rotating the tubular worm together with the worm shaft and sliding in axial direction.

The pressure receiving portion may be provided on a pressure transmitting tube which is axially pushed by the tubular worm connected with the stem nut, thereby operating a torque switch.

The means in (2) comprises a load continuous detecting apparatus in an electric valve actuator in which a worm shaft which is rotated by a motor is engaged with a tubular worm so that the worm shaft may rotate together with and slide axially on the tubular worm a stem nut rotatable together with a worm wheel which is meshed with the tubular worm being meshed with a valve stem for opening and closing a valve element, characterized in that:

a compression spring is compressed based on axial movement of said stem nut, the compression force being received a pressure receiving portion perpendicular to said valve stem and having a strain gauge, torque of said motor being detected by resistance variation of the strain gauge depending on deformation of the pressure receiving portion.

The compression spring may comprise a plurality of overlapped belleville springs.

THE PREFERRED EMBODIMENT FOR CARRYING OUT THE INVENTION

One embodiment of the present invention as described in claims 1 to 5 will be described based on the drawings.

Figure 1:
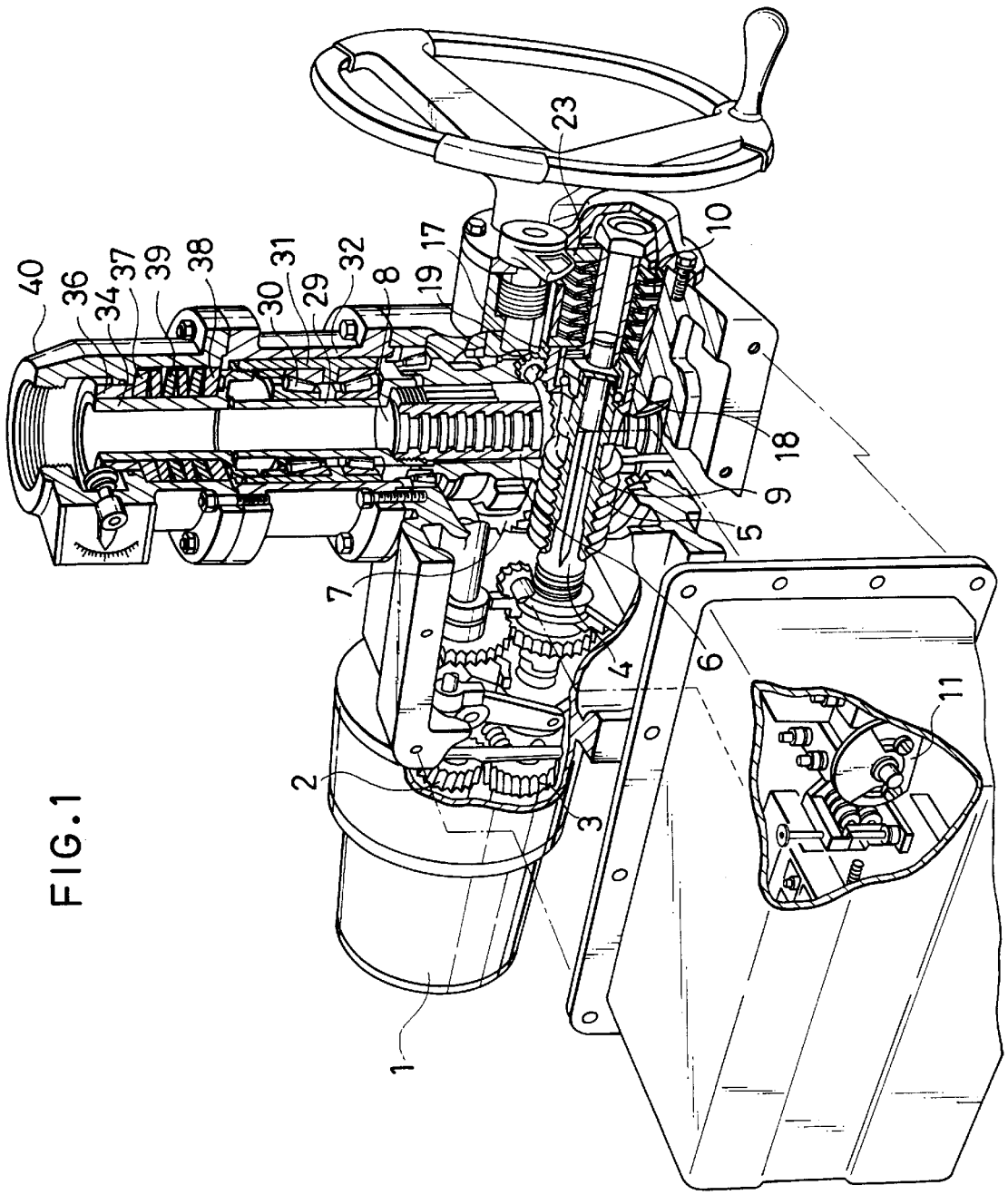
FIG. 1 is a partially cutaway perspective view of an electric valve actuator which contains an embodiment of an apparatus according to the present invention.

As mentioned as above with respect to FIG. 1, depending on direction and magnitude of torque of a motor 1, a tubular worm 5 meshed with a worm shaft 4 is moved forward and backward in an axial direction, so that a compression spring 10 is compressed.

Figure 2:
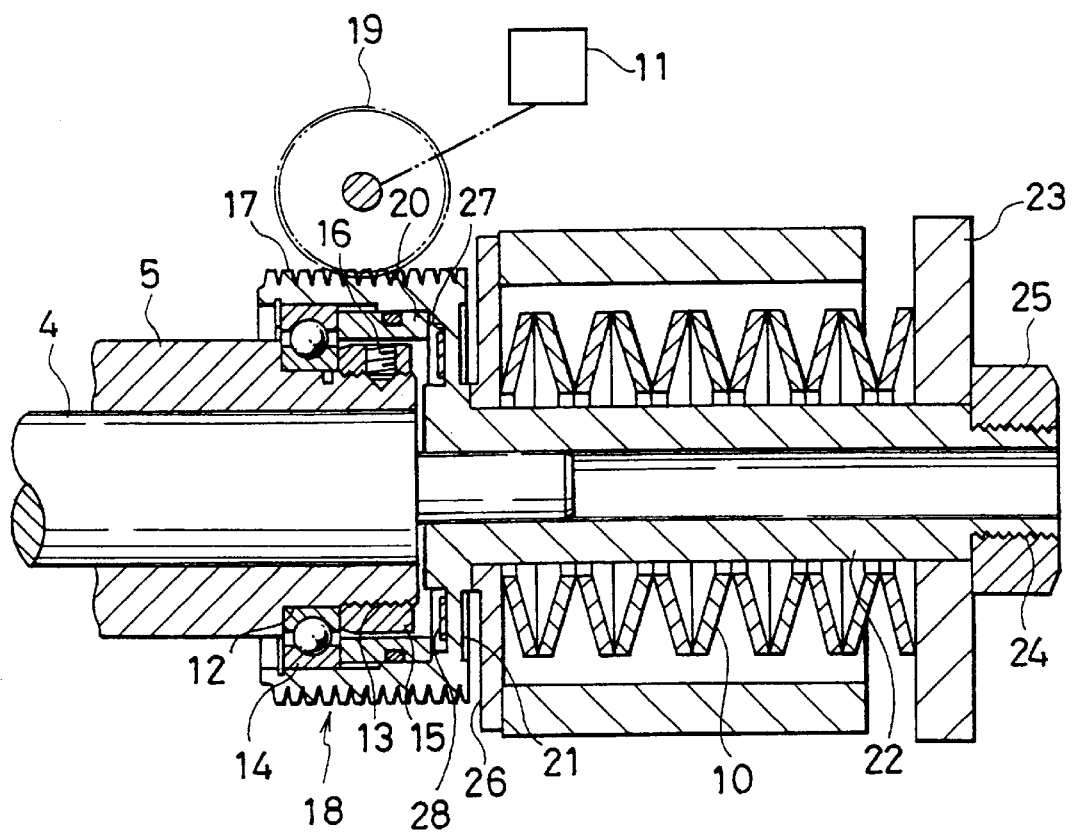
FIG. 2 is an enlarged vertical sectional view of a main portion of the apparatus according to the present invention in which torque of a motor is detected based on thrust of a tubular worm for driving a valve stem in FIG. 1.

With respect to FIG. 2, it will be described. The front end outer circumference of the tubular worm 5 forms a smaller diameter portion 12, and an external thread 13 is formed on the outer circumference of the front end of the smaller diameter portion 12. A ball bearing 14 is engaged with the rear end of the smaller diameter portion 12 and a binding ring 15 is meshed on the external thread 13, so that an inner race of the ball bearing 14 is fixed on the smaller diameter portion 12. The binding ring 15 is fixed by a knock bolt 16. On the outer circumference of the ball bearing 14, a pressure transmitting tube 18 which has an axial annular rack 17 on the outer circumferential surface is engaged. A pinion 19 is meshed with the annular rack 17, and is connected with a torque switch 11.

A holding tube 20 is engaged on the inner circumferential surface of the front end portion of the pressure transmitting tube 18. The holding tube 20 presses an outer race of the ball bearing 14 and keeps the pressure transmitting tube 18 in an axial suitable position with respect to the tubular worm 5. At the front end of the pressure transmitting tube 18, a pressure receiving portion 21 perpendicular to the axis is provided. The pressure receiving portion 21 is formed as thin as possible, and the inner circumference thereof is integrally formed with a smaller diameter sleeve 22 coaxial with the worm shaft 4. The front end of the smaller diameter sleeve 22 penetrates through the pressure receiving portion 23, and the smaller diameter sleeve 22 is fastened to the pressure receiving portion 21 by meshing a nut 23 with an external thread 24 formed on the smaller diameter sleeve 22 which is projected on the pressure receiving portion 21.

On the rear end of the smaller diameter sleeve 22, a ring-like pushing piece 26 which contacts the front inner surface of the pressure receiving portion 21 is meshed. Between the pushing piece 26 and the pressure receiving portion 21, the compression spring 10 in which a plurality of belleville springs are reversely overlapped. is engaged in a slightly compressed situation. On the rear surface of the pressure receiving portion 21, an annular groove 27 is formed to provide a thinner portion, and a strain gauge 28 is attached on the annular groove 27. A motor 1 is started, and the tubular worm 5 is rotated in a regular or reverse direction, so that forward or rearward axial component of a force is generated, depending on angles of threads of the tubular worm owing to torque. Owing to axial load of the tubular worm 5, the pressure transmitting tube 18 moves forward and backward via the ball bearing 14, the binding ring 15- and the holding tube 20. When the pressure transmitting tube 18 is moved forward, the compression spring 10 is compressed by pushing a stopper piece 23 via the pressure receiving portion 21 and the pushing piece 26.

When the pressure transmitting tube 18 is moved backward, the stopper piece 23 is stretched backward via the pressure receiving portion 21, the smaller diameter, 22 and the nut 25, the compression spring is compressed and the pushing piece 26 is pressed. In any case, reaction force involved by compression of the compression spring 10 is transmitted to a base of the pressure receiving portion 21 via the pushing piece 26. Therefore, in the pressure receiving piece 21, axial strain, curvature and inclination are generated by the pressure transmitting tube 18 held at a predetermined position of the tubular worm 5, thereby causing resistance variation corresponding to strain involved by reaction force owing to compression of the compression spring 10. Resistance variation in the strain gauge 28 is continuously fed as electric signal which shows torque by a well-known strain amplifier, load cell etc.

The foregoing relates to detection of torque of the motor. To foresee damage of the valve, it will be necessary to detect thrust which acts to an output shaft or valve stem continuously in addition to detection of torque in an input shaft or motor.

Figure 3:
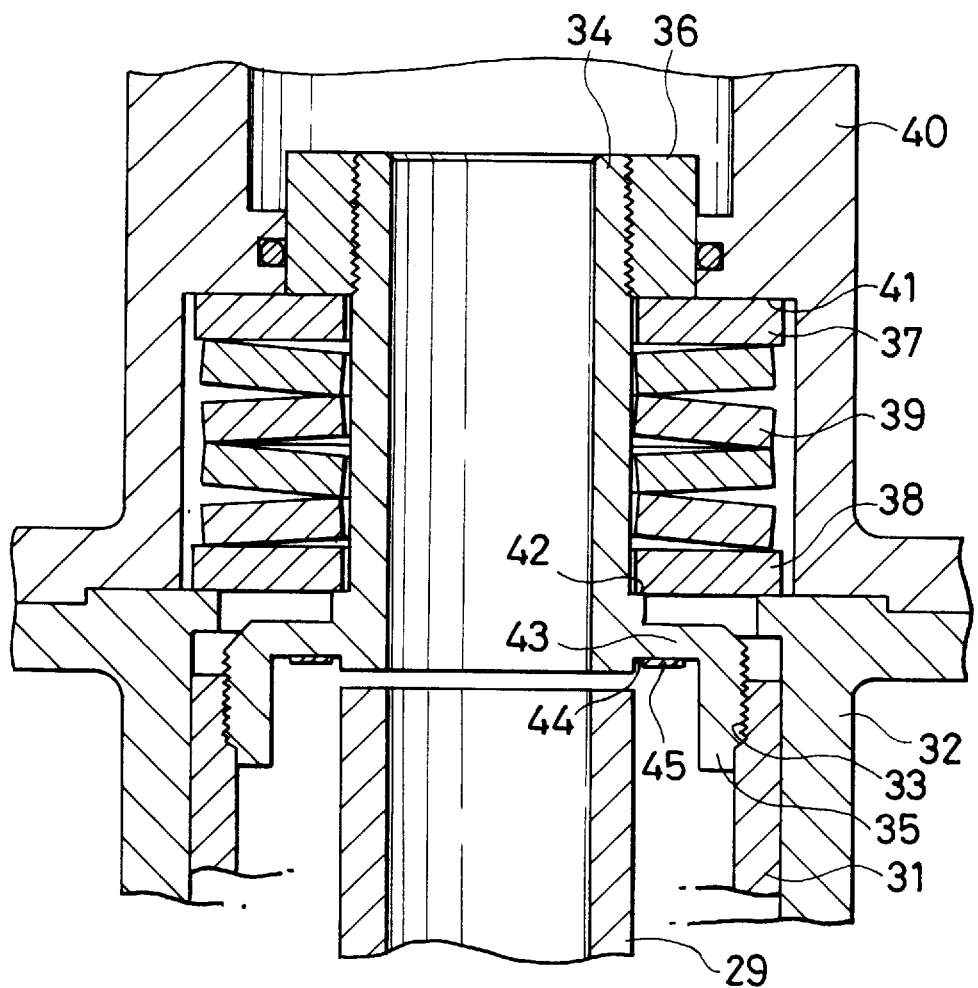
FIG. 3 is an enlarged vertical sectional view of a main portion of the apparatus according to the present invention in which torque of a motor is detected based on thrust of a stem nut for driving a valve stem in FIG. 1.

The present invention in claim 8 complies with such requirements. Thrust which acts on the valve stem can be detected by the same way as torque detection of the motor. With respect to FIGS. 1 and 3, it will be described.

At the upper end of the stem nut 6 engaged with the tubular worm 5, the thrust sleeve 29 is fixed. The thrust sleeve 29 is contained to be rotatable, but not to be movable in an axial direction in a bearing cartridge 31 via a taper roller bearing 30 meshed with the thrust sleeve 29. The bearing cartridge 31 is meshed not to be rotatable, but to be movable in an axial direction in an upper housing 32. An internal thread 33 is formed on the inner surface of the upper end of the bearing cartridge 31, and the internal thread 33 is meshed with a larger diameter tubular portion 35 at the lower end of a tubular spring cartridge 34 for fixation.

A stepped portion 42 is formed slightly upper than the larger diameter portion 35 of the spring cartridge 34. The inner circumference of a lower pressure transmitting portion 38 is engaged on the upper surface of the lower pressure transmitting piece 38, the annular compression spring 39 and the upper pressure transmitting piece 37 are engaged on the outer circumference of the spring cartridge 34. The compression spring 39 comprises a plurality o: f belleville springs. The upper pressure transmitting piece 37 is not disengaged from a nut 36 at the upper end of the spring cartridge 34.

A tubular cover 40 is mounted on the upper surface of the upper housing 32, and the outer circumference of the upper pressure transmitting piece 37 is engaged on the lower surface of stepped portion 41 of a tubular cover 40. Between the lower end of the spring cartridge 34 and the upper end of the larger diameter tubular portion 35, a slightly thinner annular pressure receiving portion 43 perpendicular to the axis is provided. An annular groove 44 is formed on the lower surface of the pressure receiving surface 43, and a strain gauge 45 is attached thereon.

In this structure, when thrust necessary to operate the valve stem 8 is changed, drive torque of the stem nut 6 is changed and axial thrust which is caused by a lead angle acts on the stem nut 6. When the thrust is directed upward, the compression spring 39 is compressed via the thrust sleeve 29, the taper roller bearing 30, the bearing cartridge 31, the spring cartridge 34 and the lower pressure transmitting piece 38.

When the thrust is directed downward, the compression spring 39 is compressed via the thrust sleeve 29, the taper roller bearing 30, the bearing cartridge 31, the spring cartridge 34 and the upper pressure transmitting piece 37. In both cases, owing to reaction force by compression of the compression spring 10, the pressure receiving portion 43 of the larger diameter tubular portion 35 is strained via the lower pressure transmitting piece 38 and the upper stepped portion 42, and the strain is detected by the strain gauge 45.

INDUSTRIAL APPLICABILITY

The following advantages are achieved by the present invention.

(1) The pressure receiving portion mounted to the strain gauge is perpendicular to the tubular worm for opening and closing a valve or an axial direction of the valve stem, and is much deformed (inclined or curved) by thrust based on axial movement of the tubular worm or the valve stem, so that fine load variation in the electric valve actuator can be exactly detected.

(2) Even if the tubular worm or valve stem is moved in an axial direction, the strain gauge is not substantially moved.

(3) Regardless of operation of the electric actuator, torque of the motor can be continuously detected.

(4) The detecting portion comprises a smaller size and can be attached to an existing actuator without affecting size of the main portion of the actuator.

The present invention exhibits great advantages especially when it is applied in a nuclear power plant, and the details are as follows:

(a) Without reconstructing the valve stem, the present invention is carried out only by reformation of the detecting portion. An existing valve can be reformed for a short time. Therefore, in a nuclear power plant in which such detecting device is strongly required, it can be provided with exposure rate to radioactivity as little as possible to workers.

(b) The detecting portion is built in the actuator portion. The strain gauge is connected with the amplifiers, and it can be set up for a short time. Inspection and maintenance require a short time on the valve actuator in a reactor container, thereby decreasing exposure rate.

(c) If necessary, during operation of a nuclear power plant, torque of the valve actuator can be grasped, thereby increasing reliability of the whole nuclear power plant.

I claim:

1. An apparatus for continuous detection of load in an electric valve actuator in which a worm shaft which is rotated by a motor is engaged in a tubular worm axially slidable, but not to rotatable, a valve element being so that the worm shaft may rotate together with and slide axially in the tubular worm, thereby opening and closing a valve, comprising:

a pressure receiving portion provided perpendicular to an axis of said tubular worm to receive thrust based on axial movement of said tubular worm, and a strain gauge mounted on the pressure receiving portion so that torque of said motor may be detected by resistance variation of the strain gauge depending on deformation of the pressure receiving portion.

2. An apparatus for continuous detection of load in an electric valve actuator comprising:

a motor;

a tubular worm;

a worm shaft which is rotated by the motor and engaged in the tubular worm so that the tubular worm may rotate together with, and slide axially on, the worm shaft;

a worm wheel, the tubular worm being engaged with the worm wheel;

a stem nut, integrally connected with the worm wheel, which elevates and lowers a valve stem;

a compression spring which is compressed by axial movement of said tubular worm, thereby detecting torque which acts on the tubular worm, by the movement of said tubular worm;

a pressure receiving portion, mounted to said tubular worm perpendicular to an axis of said tubular worm, which receives the force of said compression spring; and a strain gauge mounted on the pressure receiving portion so that torque of said motor may be detected by resistance variation of the strain gauge depending on deformation of the pressure receiving portion.

3. An apparatus for continuous detection of load in an electric valve actuator as defined in claim 2 wherein said pressure receiving Portion is provided on a pressure transmitting tube having a rack which tube is axially pushed by the tubular worm connected with said stem nut to operate a torque switch.

4. An apparatus for continuous detection of load in an electric valve actuator as defined in claim 2, wherein the compression spring comprises a plurality of overlapped belleville springs.

5. An apparatus for continuous detection of load in an electric valve actuator as defined in claim 2, wherein the tubular worm is engaged on the worm shaft with a spline so that the tubular worm may rotate together with and slide axially on the worm shaft.

6. An apparatus for continuous detection of load in an electric valve actuator as defined in claim 2, wherein said pressure receiving portion is formed on a pressure transmitting tube.

7. An apparatus for continuous detection of load in an electric valve actuator in which a worm shaft which is rotated by a motor is engaged in a tubular worm so that the worm shaft may rotate together with and slide axially in the tubular worm, a stem nut is rotatable together with a worm wheel which is meshed with the tubular worm, and said stem nut is meshed with a valve stem which moves up and down to open and close a valve, comprising:

a compression spring compressed by axial movement of said stem nut, the compression force being received by a pressure receiving portion perpendicular to an axis of said valve stem, and wherein the pressure receiving portion includes a strain gauge so that torque of the valve stem driven by said motor may be detected by resistance variation of the strain gauge depending on deformation of the pressure receiving portion.

* * * * *